United States Patent [19]

Karp

[11] 4,257,146

[45] Mar. 24, 1981

[54] STUFFED FOOD CASING BREAK DETECTOR - SHUTOFF

[75] Inventor: Joseph G. Karp, Downers Grove, Ill.

[73] Assignee: Union Carbide Corporation, New York, N.Y.

[21] Appl. No.: 45,318

[22] Filed: Jun. 4, 1979

[51] Int. Cl.³ .............................................. A22C 11/02
[52] U.S. Cl. ........................................... 17/49; 17/35; 141/95; 141/192
[58] Field of Search ............... 17/35; 141/95, 96, 192, 141/114, 314, 317

[56] References Cited

U.S. PATENT DOCUMENTS

| 3,317,950 | 5/1967 | Ziolko | 17/35 X |
| 3,533,454 | 10/1970 | Tinsley | 141/114 X |
| 4,044,426 | 8/1977 | Kupcikevicius et al. | 17/35 X |

Primary Examiner—Willie G. Abercrombie
Attorney, Agent, or Firm—Maurice W. Ryan

[57] ABSTRACT

A sizing control element on an automatic food casing stuffing apparatus is mounted to respond moveably to variations in casing internal stuffing pressure, and a pressure drop below a preselected pressure, such as will result from the occurrence of a casing break or a clip failure, is sensed and translated into an emulsion flow cut off control signal to shut down the apparatus.

11 Claims, 7 Drawing Figures

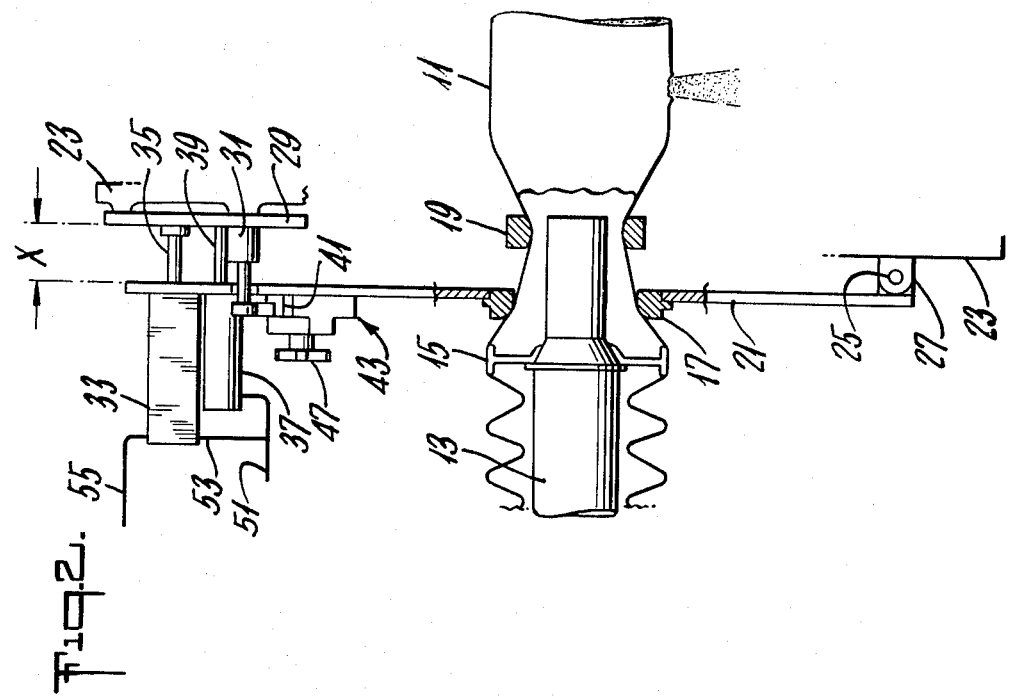
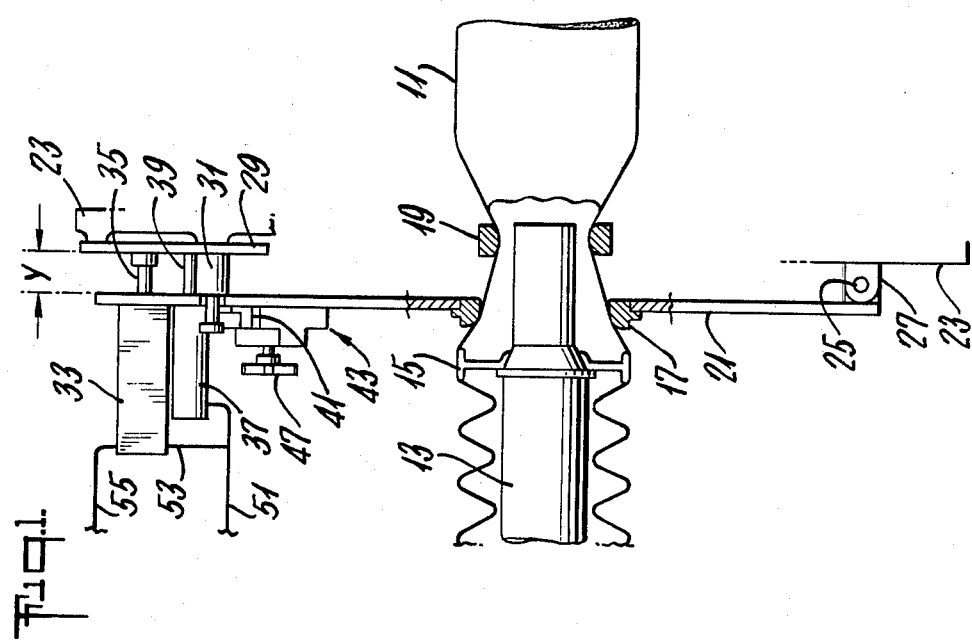

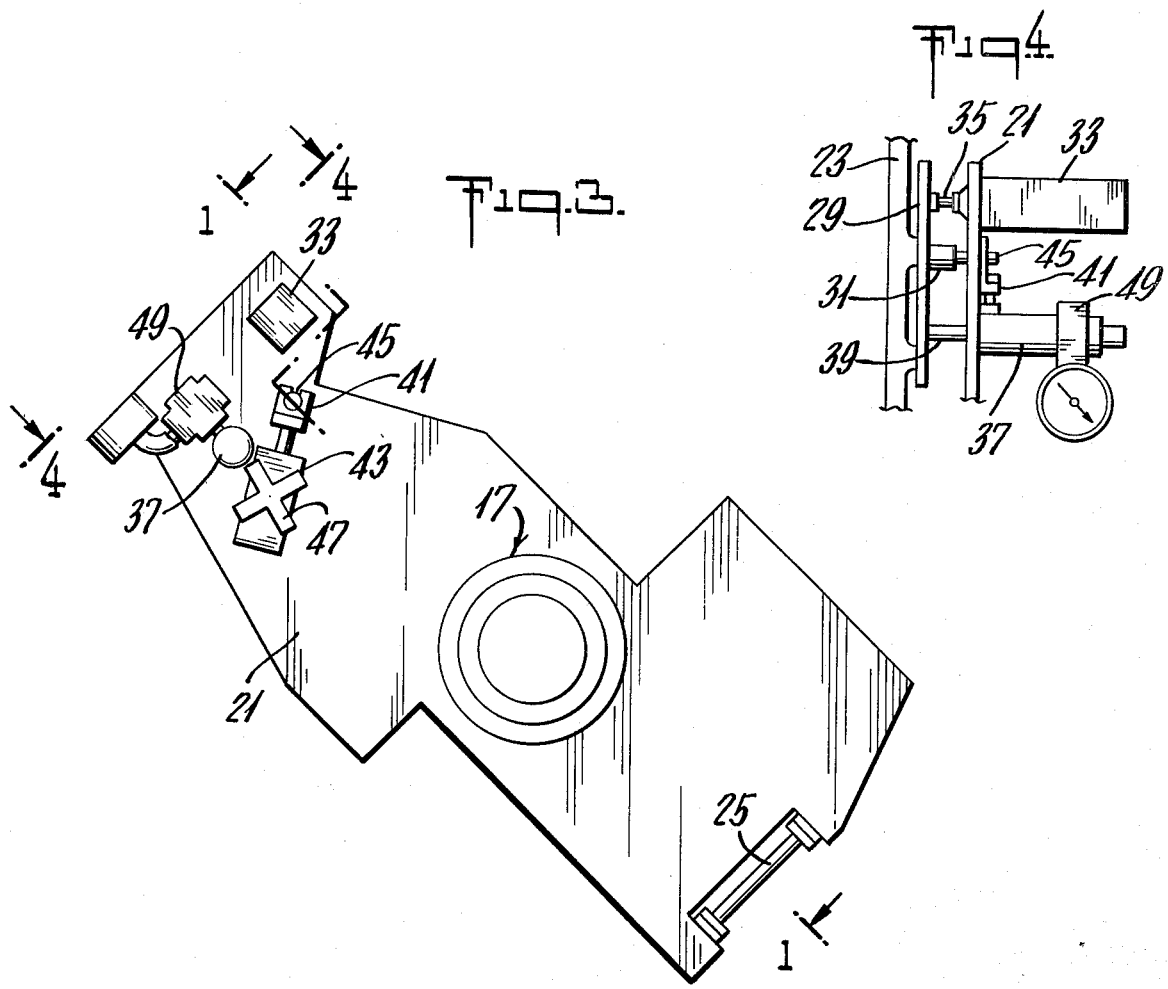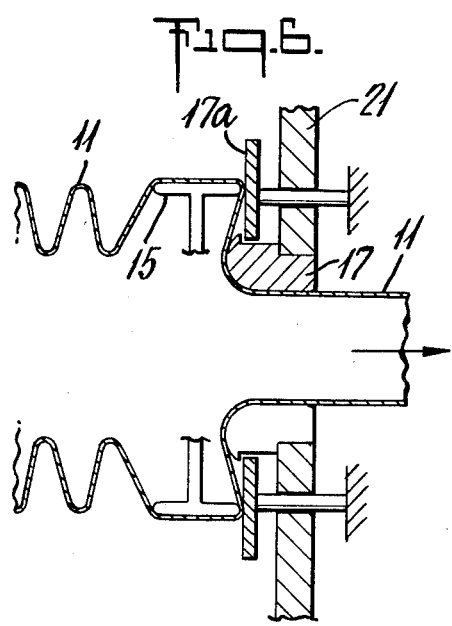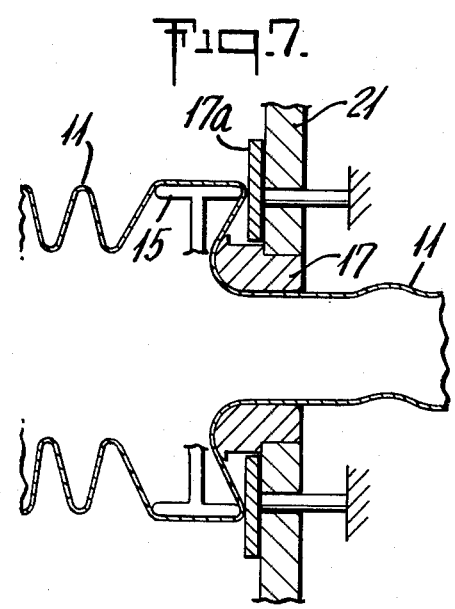

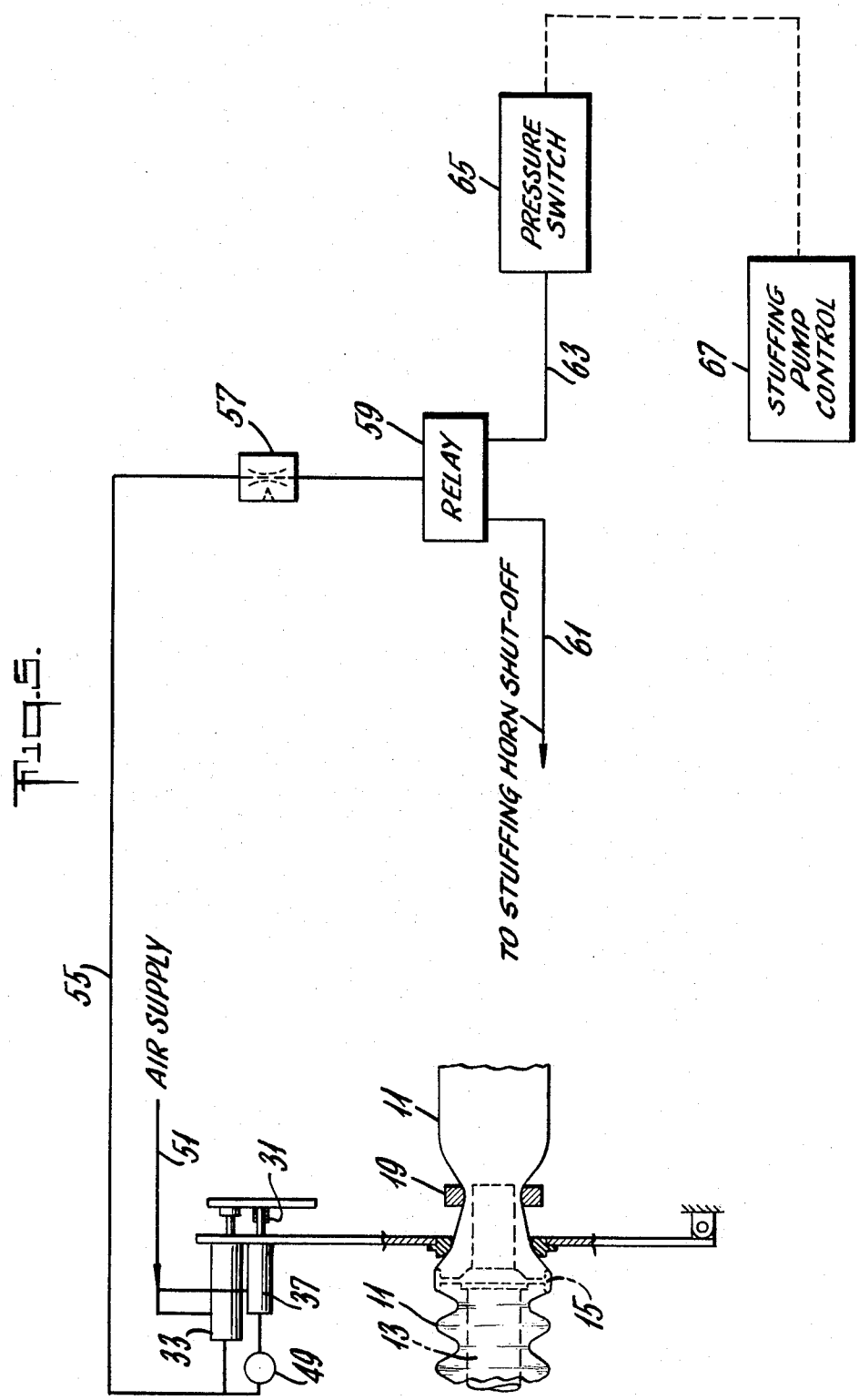

STUFFED FOOD CASING BREAK DETECTOR - SHUTOFF

This invention relates to an improved technique, apparatus, and method for the emergency shut down of automatic food casing stuffing apparatus, and, more particularly, to an emulsion flow shut-off control system which responds to a pressure drop below a preselected normal stuffing pressure, such as will be experienced upon the occurrence of a break in the casing being stuffed, or as may occur upon a casing closure clip failure. The pressure drop occasioned by any such casing rupture or failure is, in accordance with this invention, sensed, translated into an appropriate control signal, and the control signal is applied to effect prompt emulsion flow shutoff, thus minimizing product loss and malfunction down time.

BACKGROUND OF THE INVENTION

In the processed meats industry techniques are known for the automatic and semiautomatic filling of various types of casings with viscous meat emulsion to make smaller sausage products such as frankfurters and the like, and more recently, due to advances made in the technology, the larger sausage products such as bolognas, salamis, liverwursts, and the like, which had traditionally and customarily been made by unautomated essentially manual procedures. In general, these techniques include positioning a shirred continuous film casing length over a stuffing horn and thereafter continuously deshirring and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are known to persons familiar with the art as "sticks", such "sticks" being long lengths of casing which have been shirred and compressed into short, compact self-sustaining lengths, or which may be a shirred and compressed casing sheathed inside an over fitted retaining sleeve or wrapper. Apparatus and processes are well known in the food casing art for producing shirred tubular cellulosic food casings such as, for example, the apparatus and processes disclosed in U.S. Pat. Nos. 2,983,949 and 2,984,574 to Matecki. Smaller casing sticks are sometimes packaged together into unitary package articles, such as shown, for instance in U.S. Pat. No. 3,764,351. Until fairly recently, the shirred form of casing was available in only smaller diameter sizes for making frankfurter or the like linked form sausage products, the larger sausage production techniques involving the use of cut lengths uf unshirred casings. There are however, not available to industry, shirred forms of the larger casings for making bologna and similar larger products, such casings as described, for instance in U.S. Pat. No. 4,007,761. Using suitable food stuffing machinery, casing lengths of either the smaller or larger diameters are stuffed and formed into unit size links of particulate or comminuted viscous materials, meat emulsions, or the like, to make frankfurters and similar smaller products or, as the case may be, bologna and the like larger products.

In the art of producing sausages and similar food products, the finely divided meat compositions, commonly referred to as emulsions, are conventionally stuffed into tubular casing materials of long length which, as stated above, may be of natural or manufactured materials. Large sausage products which are sliced for multislice package putup are usually made in casings which range in size from the trade designation #2½ (73 mm. diameter) to #12(170 mm. diameter). In the production of large sausage products, a shirred casing length, clip-closed on one end and open on the other, is sheathed over the end of a stuffing horn on a stuffing apparatus and then stuffed with a food emulsion. As the stuffing operation progresses, the clip-closed end of the casing moves outward of the stuffing horn and the casing itself deshirrs and eventually reattains its original length, or a length substantially close to its original length. The stuffed casing is tied, or clip-closed into predetermined unit length cylindrical sausage products as the stuffing progresses until the entire length is used up, at which time, emulsion flow is shut off and a new shirred casing length is placed on the machine.

The thusly stuffed and encased food emulsion is subsequently cooked and cured according to one or the other of conventional processes, depending on the product being made, and may thereafter be, and, in the case of the larger diameter products, usually is, sliced and packaged into units of predetermined weight and slice count for retail sale.

For many years, the apparatus and methods employed to prepare such encased food products, particularly food products encased in large diameter casings, have relied largely if not exclusively on manual manipulation in controlling the stuffing of food emulsion into predetermined length sausage links or packages. The casings used with these earlier types of stuffing apparatus were furnished in precut unshirred lengths which had to be presoaked before being placed on the stuffing horns. Recent advances in the art have provided apparatus for greater automation of stuffing operations in production of the larger diameter sausage products and have provided means for preparing uniformly sized larger products with precision, speed, consistent reproducibility and reliability in manufacture comparable to, and heretofore only experienced in, the technique of the smaller sausage products manufacture. Of particular interest in this regard is the U.S. Pat. No. 4,044,426.

An automatic sausage casing stuffing technique such as that illustrated in U.S. Pat. No. 4,044,426, involves the combination of a sizing ring or disc arranged and disposed inside the casing being stuffed, coacting with an annular snubbing ring arranged and disposed exteriorly of the casing a selectably variable distance along the casing length from the sizing ring. The sizing ring has an outer rim circumference greater than the inner circumference of the casing, and the annular snubbing ring has an inner passage circumference smaller than the outer circumference of the finished sausage product being made. Both the sizing disc and the snubbing ring are disposed in coaxial alignment with the stuffing horn of the sausage making machine, and provision is made to controllably vary the linear distance between the sizing disc and the snubbing ring.

By lessening linear distance between the sizing disc and the snubbing ring the change in the path of casing moving from its stretched circumference as it deshirrs over the sizing disc, to its proscribed circumference as it passes through the space between the stuffing horn outer surface and the inner passage circumference of the snubbing ring, becomes more abrupt and increased frictional forces at the areas of casing contact with these control elements will increase a braking or holdback action on the casing. Conversely, by increasing the linear distance between the sizing disc and the snubbing ring, the change in the path of the casing between these two casing contacting elements becomes less abrupt, effecting a decrease in frictional forces at the casing contact areas with a consequent decrease of braking or holdback action on the casing. Thus, for a given and reasonably closely maintained set of operating parameters, including type and condition of casing, consistency of the emulsion, emulsion pump speed and output pressure and, say the parts wear condition of the stuffing apparatus, an increased holdback force on the casing will tend to cause higher casing internal pressure and a larger product circumference, while decreased holdback force on the casing will lessen casing internal pressure and make for a smaller product circumference.

Since the desideratum is to maintain a constant product circumference, suitable for the automatic slicing, weighing and packaging procedures which follow, the linear distance between the sizing disc and the snubbing ring is controllably changed to compensate for variations and aberrations in the other aforedescribed operating parameters which are not so easily controlled.

Thus, since the above-described stuffing operations inherently involve casing internal pressure, it is possible from time to time to experience a casing failure such as from a break or weak spot in the casing. It is also possible to experience a clip or tie application failure. Both such occurences result in squirting out of the emulsion, with attendant loss of product, emergency shut down procedures, clean up, and lost production time. In the days when the stuffing techniques were somewhat less automated and slower, casing breaks and clip failure were not as great a casue for concern, because the stuffing operator, of necessity, was always at his post right at the stuffing machine, hand feeding the casing off the stuffing horn, and could thus effect the necessary shut down procedures promptly upon the occurence of any malfunction. With the present day high speed and more automated machines and processes, however, the operators are not always immediately within the range of access to the controls, and a casing break or clip failure can cause extremely troublesome results, especially in the stuffing of the larger sausage products since the emulsion volumes in process are so much greater than the volumes comprehended in smaller sausage product manufacture.

GENERAL DESCRIPTION OF THE INVENTION

With this then being the state of the art, the present invention was conceived and developed to provide for the detection of an abnormal emulsion pressure drop in a food casing stuffing operation, the translation of the detection of such a condition into sensible indicia, such as a control signal, and the transmission and application of such indicia or signal to an apparatus control element so as to effect emulsion flow cutoff and automatic shut down of the stuffing apparatus.

The invention also provides for inclusion of and combination with a timer device which is arranged in the control circuit to momentarily negate or bypass the automatic break detector shutoff signal until stuffing operation is resumed on a freshly installed casing length, or a restart after shutdown.

In general the invention relates to food casing stuffing apparatus having means for controllably stopping a stuffing operation in response to a pressure drop below a pressure drop known to be representative of a casing failure comprising, in combination: stuffing pressure detection means operably disposed to detect and respond to changes in pressure of food product being stuffed inside the casing; signal generating means operably connected to said detection means and adapted to develop sensible indicia corresponding to the changes in pressure detected with said detection means; means to communicate the indicia developed by said signal generating means to the emulsion flow control means on the stuffing apparatus; and means to translate said indicia into operative effect on said control means.

In particular embodiments of apparatus according to the invention, the stuffing pressure detection means is a device disposed in contiguous contact with the outer surface of a casing being stuffed, mounted to move reciprocally between a first position corresponding to a preselected high internal casing pressure and a second position corresponding to a preselected low internal casing pressure. This general embodiment may advantageously be in the form of a stuffing machine snubbing ring mounted in a swingeable pivoted panel, the movement of which corresponds to casing internal pressure, and which activates a transducer to produce the requisite signal.

The signal generating means, control loop transmission circuit, and the signal translating means, may involve the use of mechanical to electrical, pneumatic, hydraulic, and electronic transducers or combinations of these.

The invention may also combine timing means operably interposed in the control circuit sequence to negate the effect of the pressure drop signal for a preselected time period.

In a further alternative embodiment of apparatus according to the invention, the improvement of a two-element or split snubbing or pressure ring is used to provide workability of the sensor-detector mechanisms under operating conditions when the sizing ring is run up tight against the pressure ring to achieve maximum holdback on the casing.

DETAILED DESCRIPTION OF THE INVENTION

The invention will now be described in detail and with reference to the drawing, wherein:

FIG. 1 is a top plan diagrammatic view of apparatus according to the invention shown mounted on an automatic stuffing machine with casing being stuffed with emulsion under normal operating conditions;

FIG. 2 is the apparatus arrangement shown in FIG. 1 shows under conditions of an emulsion pressure drop corresponding to a casing break or a clip failure;

FIG. 3 is a detailed view of a pivotally moveable pressure plate according to the invention and as shown in FIG. 1 and 2;

FIG. 4 is an end view presentation of the pressure plate element shown in FIG. 3;

FIG. 5 is a schematic control diagram showing the control signal path in an embodiment of the invention; and FIGS. 6 and 7 are sectional representations illustrating the operation of the invention in conjunction with a two-element or split pressure ring.

In FIG. 1 of the drawing a stuffing operation is shown schematically, with a casing 11 being stuffed with an emulsion through a stuffing horn 13. The emulsion flow is in the direction from left to right in FIG. 1, and as the stuffing progresses, the casing 11 deshirrs over an internal sizing ring 15, passes through an external pressure ring 17, and an external sealing ring 19 at the discharge end of stuffing horn 13. Pressure ring 17 is mounted fixedly in a pressure plate 21, which ordinarily would be a fixed portion of the stuffing machine main frame, but in this instance, that is to say as part of the present invention, is mounted pivotally to the machine main frame 23 or some other relatively fixed apparatus component such as for instance the machine clipper carriage, by a pivot pin 25 journaled to move pivotally in pivot pin mounts 27, the entire pivot and mount assembly functioning as a hinge on which the pressure plate 21 swings through a limited travel of about 0.32 cm of travel at the remote or unhinged end as shown at the left in the drawing FIGS. 1 and 2.

The detector-sensor transducer assembly at the unhinged end of the pressure plate 21 shown at the left in drawing FIGS. 1 and 2 comprises a strike plate 29 fixedly mounted on the machine main frame 23, or, alternatively, on some other fixed component of the machine such as the clipper carriage; a spacer 31 extending from the strike plate surface towards the pressure plate and arranged to limit the pressure plate travel in the product stuffing direction; a stem activated pneumatic valve 33 mounted on pressure plate 21 having an actuator 35 extending through an aperture in the pressure plate into contact with strike plate 29; and a pneumatic cylinder 37 mounted on the pressure plate 21 having an air pressure biased moveable rod 39 extending through another aperture in plate 21 into contact with strike plate 29, which functions as an air spring tending to push pressure plate 21 away from spacer 31.

A captivating assembly serves to stabilize and limit the pressure plate travel in the direction opposite the product stuffing direction, and comprises an open ended fork element 41 held in place by a screw down latching element 43. A shouldered machine screw 45 extends through a screw port in the pressure plate 21 and threads into a tapped hole in spacer 31, with the screw shoulder disposed to effect bearing contact on the open-ended fork element 41. The latching element 43 is used to disengage the fork element 41 from under the screw shoulder, permitting the pressure plate to be swung back clear of the captivating assembly and out of the way to facilitate machine cleaning and maintenance procedures. Locking knob 47 threadedly engages the body of latching element 43 and bears lockably on the fork element 41, holding it in place against the rear surface of pressure plate 21. The assembly is thus stabilized within a swingable movement range limited in one direction; the direction of stuffing, by the impingement of the pressure plate 21 face on the spacer 31, and in the other direction by the impingement of the open-ended fork element 41 tines under the shoulder of screw 45.

A pressure regulator 49, FIGS. 3 and 4, may advantageously be provided on pneumatic cylinder 37 to adjust the set the spring-back force required for a given stuffing operation. Air lines 51, 53, 55, shown only partially in FIGS. 1 and 2 for purposes of clarity, but more completely in FIG. 5, supply air for actuation and control of the pneumatic elements of the apparatus.

FIGS. 3 and 4 of the drawing show the pressure plate and the above-described assemblies separate from the stuffing apparatus but with the air lines omitted for greater clarity.

In normal operating condition illustrated in FIG. 1 of the drawing, emulsion being pumped through the stuffing horn 13 into the deshirring and expanding casing 11 effects a resultant pressure on pressure ring 17 in the direction of product flow. Under this resultant forward pressure, the pressure plate 21 is urged forward against spacer 31, depressing the actuator 35 into pneumatic valve 33 and holding it there with the valve 33 in a nonpassing or "air-off" mode, the distance between the strike plate 29 and the face of the pressure plate 21 being "y" in this condition. Pressure regulator 49 is set on pneumatic cylinder 37 to a pressure which will insure positive spring-back of the pressure plate from the moveable rod 39 pushing against the strike plate 29. The spring back force required depends upon the static holdback tension on the casing 11, which, in turn, depends upon casing size and type, stuffing pressure, and various other stuffing machine parameters and control settings. The holdback tension is, however, essentially constant throughout any specific production run so that pressure regulator 49 requires adjustment and setting only at the beginning of a run which may utilize a different size or type of casing than just previously used in a prior run.

Upon the occurrence of a casing break as illustrated in FIG. 2 or, as the case may be, a clip failure, there is a pressure drop in the emulsion inside the casing and stuffing horn and a consequent lessening of forward pressure against the pressure ring and pressure plate until the spring-back force exerted by pneumatic cylinder 37 and its moveable rod 39 overcomes the forward pressure and produces a net resultant rearward pressure in the direction opposite the stuffing direction. With this condition obtaining, the pressure plate 21 swings rearwardly to the position shown in FIG. 2, the pneumatic valve actuator 35 extends from the valve 33 into a passing or "air-on" mode, and the distance between the strike plate surface and the front face surface of pressure plate 21 increases to "x". This rearward travel is limited by the captivating assembly described hereinabove, and the total travel distance equals "x"-"y".

FIG. 5 of the drawing schematically illustrates how the physical movement of the elements of the invention described hereinbove are translated into useful control signals to effect stuffing machine shut down.

Supply air at conventional pneumatic control pressure feeds pneumatic valve 33 and pneumatic cylinder 37 through air lines 51, 53 as shown. In the case of the pneumatic cylinder 37, the air supply connects through pressure regulator 49, the function and operation of which is described hereinabove. Let it be assumed that FIG. 5 represents a condition of malfunction, that is to say a condition which occurs when there is a casing break or a clip failure. The elements of the sensor detector assembly are shown in free body schematic form for the purpose of FIG. 5. Whereas, in reality, the pneumatic valve 33 and pneumatic cylinder 37 mount on the pressure plate 21 with their respective actuator 35 and moveable rod 39 contacting the strike plate 29 as shown in FIGS. 1 and 2, FIG. 5 shows these components fixed in space with their actuator and rod motivated by the pressure plate 21.

In FIG. 5, then, air from air supply lines 51, 53 flows through pneumatic valve 33 which is in the pass or "air-on" mode and out through air line 55 as a pneumatic signal, through time delay relay 57 into a multiplexing relay 59. Multiplexing relay 59 translates the pneumatic signal from valve 33 into two signals, one of which is transmitted through air line 61 to pneumatically close the stuffing horn shut off valve and stop the emulsion flow into the casing, and the other transmitted through air line 63 to a pressure switch 65 which transmits an electrical shut down signal to the stuffing pump motor control 67.

The time delay relay 57 is provided to temporarily negate operation of the break detector shut down system. Each time the machine begins to stuff a fresh casing length, there is an initial condition of no pressure on the pressure ring which would, but for the time delay relay 57, result in a spurious break signal and continuance of the machine in a shut down condition. By manually setting the time delay relay 57, the start up can take place with the break detector system momentarily disabled.

FIGS. 6 and 7 of the drawing show the arrangement of pressure ring and pressure plate used advantageously in combination with the apparatus according to the invention. The essential feature of the apparatus illustrated in FIGS. 6 and 7 is a two-element pressure ring, called a split-ring. In the earlier embodiments of apparatus according to the invention as illustrated in U.S. Pat. No. 4,044,426, the sizing disc never came closer than about 0.16 cm (1/16 inch) away from the pressure ring. This mode of operation always allowed for some movement in the pressure ring, which movement could be utilized to actuate the sensor-detector devices of the break detector apparatus of this invention. In some of the more recent operational techniques involving stuffing machinery, however, it has become increasingly necessary or desireable to run the sizing disc up close against the pressure ring in such a manner that there was no leeway for rearward movement of the pressure ring or pressure plate upon the occurrence of a break. Since this would prevent operation of the sensors and detectors which constitute the sensing assembly of the break detector according to this invention, it became necessary to modify and develop a new type of pressure ring. The so-called split ring or two-element ring is shown in FIGS. 6 and 7. The pressure ring, shown in cross section in these Figures, comprises a main section 17 and an annular flat surfaced section 17a mounted concentrically to move axially back and forth along the stuffing machine longitudinal axis. The main portion of pressure ring 17 is still affixed rigidly to pressure plate 21 and the 17a component is free to move back and forth in the recess defined between the main portion of ring 17 and pressure plate 21.

The normal, or no fault condition of operation is shown in FIG. 6. Under this condition, the stuffing pressure urges the main pressure ring 17 element and pressure plate 21 to which it is affixed forward of the element 17a. The ultimate adjustment between the pressure ring 17 and the sizing disc 15 is shown in FIG. 6, that is to say with the sizing disc tightly up against the pressure ring, in this case its supplemental element 17a.

Upon the occurrence of a casing failure or clip failure, the pressure plate 21 and the main portion of pressure ring 17 swings rearwardly as shown in FIG. 7 of the drawing. The elements mounted on pressure plate 21 act in the same manner as described hereinabove.

It can be appreciated that if there was no relative movement between the elements 17–17a of the split pressure ring illustrated in FIG. 6 and 7 of the drawing, there would be no provision for rearward movement of the pressure plate 21 upon the occurrence of a fault or casing break.

The foregoing description of the invention is intended to be illustrative only, it being considered reasonable that persons conversant with the mechanical arts will utilize numerous alternative embodiments and components to effect the same result but all within the spirit and scope of this invention. It is possible and feasible, for instance, to provide completely electrical controls instead of the pneumatic controls described hereinabove. These could take the form of lever actuated limit switches, control type solenoids with adjustable voltage coils, electrical relays, etc. all to attain the same overall control loop function illustrated in FIG. 5 of the drawing. Similarly, hydraulic, electronic, or purely mechanical components could be adapted and engineered to fulfill the same control functions as comprehended by this invention.

The exact manner in which the pressure decrease in the casing is detected is also a matter for several alternative operative modes. It is possible, for instance, to actuate the sensors and transducers by direct contact of the pressure ring 17 itself rather than by contact through means of a pressure plate. Similarly, it is possible to adapt components for direct contact with the casing itself in such a manner that a decrease of internal pressure within the casing would transmit sensible indicia to sensor elements contacting the outer casing surface. It is therefore intended that the foregoing description of the invention be taken as illustrative only and not in any limiting sense, it being intended to define the invention in accordance with the claims.

What is claimed is:

1. In food casing stuffing apparatus wherein viscous product is stuffed into a food casing length, means for controllably stopping a stuffing operation in response to a pressure drop below a preselected pressure indicative of a casing failure, comprising, in combination:

stuffing pressure detection means operably disposed to detect and respond to changes of pressure within a casing being stuffed;

signal generating means operably connected to said detection means and adapted to develop sensible signals corresponding to the changes in pressure detected with said detection means;

means to communicate the signals developed by said signal generating means to control means operably connected to the stuffing apparatus; and means to translate said signals into operative effect on said control means.

2. Apparatus according to claim 1 in combination with timing means operably interposed in the control sequence between the signal generating means and the stuffing apparatus control means, arranged and disposed to negate the effect of said signals upon said control means for a preselected period of time.

3. Apparatus according to claim 1 wherein said stuffing pressure detection means is an element in contiguous contact with the outer surface of a casing being stuffed, mounted to move reciprocally between a first position corresponding to a preselected high internal casing pressure and a second position corresponding to a preselected low internal casing pressure representative of a casing failure.

4. Apparatus according to claim 1 wherein said stuffing pressure detection means comprises an assembly of a pressure ring of the stuffing apparatus fixedly mounted in a moveable plate element adapted to move reciprocally between a first position and a second position; and said signal generating means comprises a transducer fixedly mounted and having a moveable actuating component in contact with said plate element.

5. In food casing stuffing apparatus which includes an external pressure snubbing ring operating conjunctively with a sizing disc internally of a casing being stuffed, means for controllably stopping a stuffing operation in response to a casing failure comprising, in combination:
  means to moveably mount said pressure ring and permit its reciprocal movement between a first position corresponding to normal stuffing pressure and a second position corresponding to a pressure drop indicative of a casing failure;
  sensor-signal generating means arranged and disposed to detect the movement between said first position and said second position and to develop a signal when said element is in said second position;
  means to communicate the signal developed by said sensor-signal generating means to control means operably connected to the stuffing apparatus; and
  means to translate said signal into operative effect on said control means to stop the operation of said stuffing apparatus.

6. Apparatus according to claim 5 wherein the sensor-signal generating means, the means to communicate the signal to the stuffing apparatus control means, and the means to translate the signal into operative effect on the control means, are pneumatic means.

7. Apparatus according to claim 5 wherein the sensor-signal generating means, the means to communicate the signal to the stuffing apparatus control means, and the means to translate the signal into operative effect on the control means, are electromechanical means.

8. Apparatus according to claim 5 wherein the sensor-signal generating means, the means to communicate the signal to the stuffing apparatus control means, and the means to translate the signal into operative effect on the control means, are hydraulic means.

9. A method for controllably stopping a stuffing apparatus stuffing viscous food product into a food casing length upon the occurence of a pressure drop below a preselected pressure indicative of a casing failure comprising the steps of:
  continuously measuring the pressure within a casing being stuffed;
  developing signals corresponding to changes in said pressure;
  transmitting said signals to control means operably connected to stuffing apparatus; and
  converting any signal of said signals which corresponds to the pressure drop below said preselected pressure into operative stopping effect on said control means to stop said stuffing apparatus.

10. A method according to claim 9 wherein a time delay is interposed in the steps between measuring the pressure and operating said control means to stop the stuffing apparatus.

11. A method according to claim 9 wherein the pressure within the casing being stuffed is measured through relative movements of the casing outer surface.

* * * * *

UNITED STATES PATENT AND TRADEMARK OFFICE
CERTIFICATE OF CORRECTION

PATENT NO. : 4,257,146
DATED : March 24, 1981
INVENTOR(S) : Joseph G. Karp

It is certified that error appears in the above—identified patent and that said Letters Patent is hereby corrected as shown below:

Column 1, line 55, change "uf" to --of--.

Column 1, line 56, change "not" to --now--.

Column 4, line 57, change "FIG." to --FIGS.--

Column 5, line 60, change the first occurring "the" to --and--.

Signed and Sealed this

Twenty-fifth Day of August 1981

[SEAL]

Attest:

GERALD J. MOSSINGHOFF

Attesting Officer    Commissioner of Patents and Trademarks